J. J. REGGIO.
TROLLEY POLE.
APPLICATION FILED AUG. 17, 1918.
1,358,574.
Patented Nov. 9, 1920.
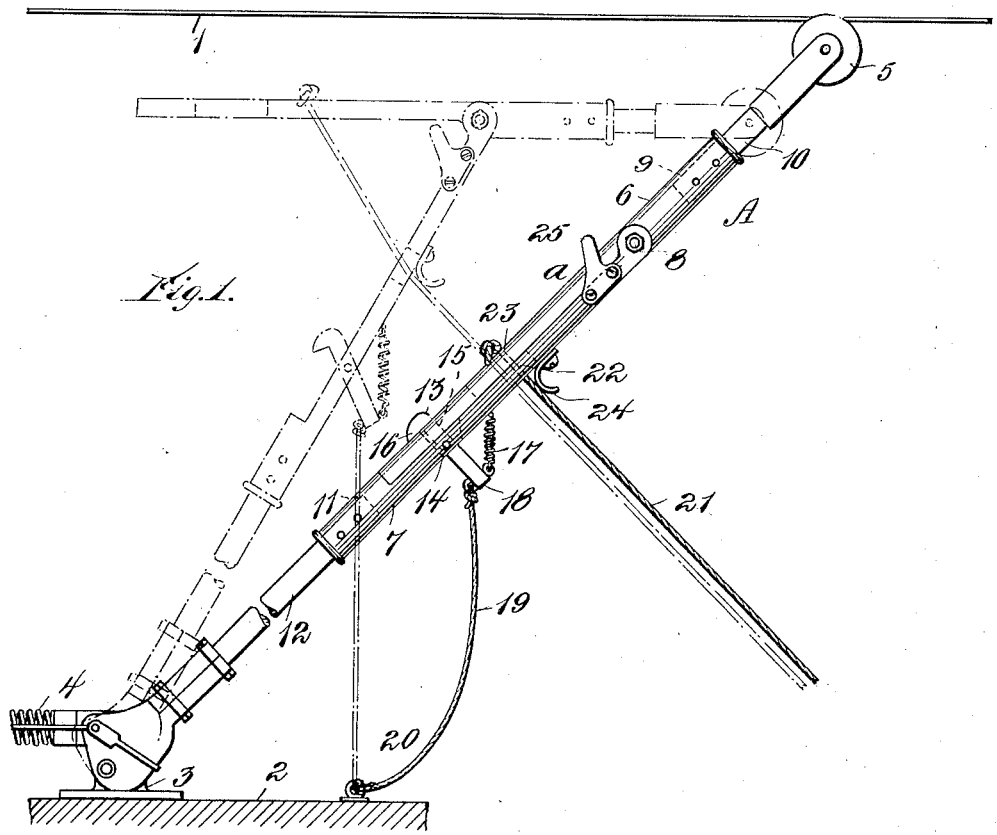
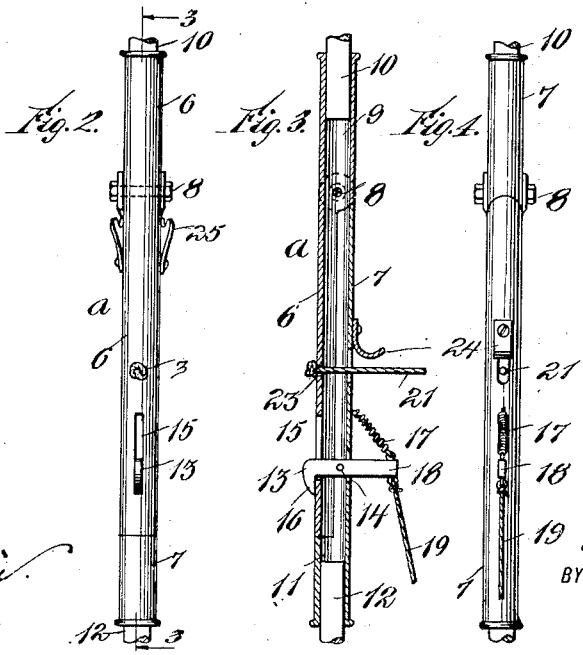
WITNESSES
INVENTOR
J. J. Reggio.
BY
ATTORNEYS

UNITED STATES PATENT OFFICE.

JULES JOSEPH REGGIO, OF NEW ORLEANS, LOUISIANA.

TROLLEY-POLE.

1,358,574.	Specification of Letters Patent.	Patented Nov. 9, 1920.

Application filed August 17, 1918. Serial No. 250,400.

*To all whom it may concern:*

Be it known that I, JULES J. REGGIO, a citizen of the United States, and a resident of New Orleans, in the parish of Orleans and State of Louisiana, have invented a new and Improved Trolley-Pole, of which the following is a full, clear, and exact description.

This invention relates to trolley poles and has to deal more particularly with a construction whereby the trolley wheel when it leaves the trolley wire will be automatically lowered to a point below the wire and wire suspension system so as to prevent injury to the latter, trolley wheel or pole.

The invention has for its general objects to improve the construction and operation of devices of this character so as to be reliable and efficient in use, comparatively simple and inexpensive to manufacture, and so designed as to be readily applied to trolley poles already in use, simply by cutting out an intermediate part thereof and inserting the construction that forms the present invention.

A more specific object of the invention is the provision of a trolley pole having an upper section hingedly mounted and provided with an automatic means whereby the upward throw of the trolley pole, when the wheel leaves the wire, will cause the upper wheel-carrying section to be released so that it will swing down to a position where the wheel will be clear from the trolley wire and the suspension system therefor.

With such and other objects in view, the invention comprises various novel features of construction and arrangement of parts which will be set forth with particularity in the following description and claims appended hereto.

In the accompanying drawings which illustrate one embodiment of the invention and wherein similar characters of reference indicate corresponding parts in all the views, Figure 1 is a side view of the trolley pole showing the normal position of the parts of the trolley pole by full lines and the collapsed position of the parts by dotted lines;

Fig. 2 is a front view of the improved part of the trolley pole;

Fig. 3 is a sectional view on the line 3—3, Fig. 2;

Fig. 4 is a rear view.

Referring to the drawing, 1 designates a trolley wire, 2 the roof of an electric car on which is mounted the trolley pole A pivoted on a base 3 fastened to the roof 2 and operated on by a spring 4 to yieldingly hold the trolley wheel 5 in underrunning contact with the wire. The trolley pole in the present instance is shown as one that has been in use and an intermediate portion is cut away, and the device $a$, which constitutes the present invention, is substituted. This device is composed of two rod-like members 6 and 7 hingedly connected by a pivot 8, the upper end of the section 6 being provided with a socket 9 to receive the upper part 10 of the trolley pole, and the section 7 has a socket 11 at its lower end to receive the lower part 12 of the trolley pole. By this arrangement the portion of the pole above the pivot 8 can swing downwardly and rearwardly so that the wheel 5 will be considerably below the trolley wire and suspension system therefor in case the trolley wheel should leave the trolley wire.

Normally the members 6 and 7 are held in parallel relation by a catch 13 which is pivoted at 14 on the section 7, and the holding part of the catch passes through an aperture 15 of the section 6 and has a projection 16 that interlocks with the section 6, as shown by full lines in Fig. 1. A spring 17 yieldingly maintains the catch in holding position. Attached to the lower end 18 of the catch is a rope 19 that is fastened at 20 to the roof or some other part of the car, and there is sufficient slack in this rope to prevent any releasing pull on the catch, but when the trolley pole swings upwardly to an abnormal extent by the wheel leaving the trolley wire, the catch is released by the rope so that the upper wheel-carrying section of the trolley pole will swing downwardly, as shown by dotted lines, Fig. 1.

The upper wheel-carrying section is restored to normal position by the trolley pole rope 21, which passes through an aperture 22 in the lower section of the trolley pole and connects at 23 with the section 7 at the side of the pivot 8 opposite from the trolley wheel. When the parts are in the broken-line position, Fig. 1, the downward pull on the rope 21 will first swing the section 6 into parallelism with the member 7, and a further pull will cause the trolley pole to swing downwardly as a unit, and by so doing the catch-operating rope 19 slackens so that the spring 17 will cause the catch 13 to automatically re-set. A guard 24 at the aperture 22 reduces wear on the trolley rope. The upper part of the member 7 is provided with flaring lugs or ears 25 to guide the section 6 as it becomes seated on the section 7 during the straightening out of the trolley pole after it has been collapsed.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A trolley pole composed of an upper wheel-carrying section, a lower supporting section, means for pivotally connecting the sections whereby the wheel-carrying end of the upper section can swing downwardly and rearwardly, a catch for holding the sections in operative position, and a flexible member having one end secured so as to permit movement in a vertical direction, the other end being secured to the catch, the flexible member being normally slack and releasing the catch when the trolley pole swings upwardly beyond its normal limit, whereby the wheel-carrying section can be released to support the wheel below a trolley wire and its suspension system.

2. A trolley pole composed of an upper wheel-carrying section, a lower supporting section, means for pivotally connecting the upper section at an intermediate point to the upper extremity of the supporting section, a catch on the supporting section and releasably engaging the upper section to hold the same in normal position, a car on which the trolley pole is mounted, and a normally slack element connected with the catch and with the car, whereby the catch is released when the trolley pole swings upwardly beyond a certain point.

3. A trolley pole composed of an upper wheel-carrying section, a lower supporting section, means for pivotally connecting the upper section at an intermediate point to the upper extremity of the supporting section, a catch on the supporting section and releasably engaging the upper section to hold the same in normal position, a car on which the trolley pole is mounted, a normally slack element connected with the catch and with the car, whereby the catch is released when the trolley pole swings upwardly beyond a certain point, and a trolley rope connected with the upper section at the side of the pivot opposite from the wheel thereon and guided on the supporting section, whereby a pull on the rope will first reset the sections of the trolley pole and then move the latter downwardly for engaging the wheel thereof with a trolley wire.

4. A trolley pole composed of a wheel-carrying section, a supporting section on the upper end of which the wheel-carrying section is pivoted at a point intermediate its ends, a catch pivoted on the supporting section and extending through an aperture in the wheel-carrying section and adapted to engage with the latter, a spring for normally holding the catch in holding position, a normally slack pull device connected with the catch for releasing the same when the trolley pole moves beyond a given point, and a trolley pole rope having a sliding engagement with the supporting section and fastened to the wheel-carrying section at the side of the pivot of the latter opposite from the wheel-carrying portion.

JULES JOSEPH REGGIO